United States Patent
Hiroyuki et al.

(10) Patent No.: US 12,499,616 B2
(45) Date of Patent: Dec. 16, 2025

(54) SEMANTIC GUIDANCE FOR 3D RECONSTRUCTION

(71) Applicant: HUAWEI TECHNOLOGIES CO., LTD., Guangdong (CN)

(72) Inventors: Sato Hiroyuki, Tokyo (JP); Uragaki Keishiro, Tokyo (JP)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 210 days.

(21) Appl. No.: 18/170,661

(22) Filed: Feb. 17, 2023

(65) Prior Publication Data
US 2023/0206550 A1 Jun. 29, 2023

Related U.S. Application Data

(63) Continuation of application No. PCT/CN2020/110387, filed on Aug. 21, 2020.

(51) Int. Cl.
*G06T 17/00* (2006.01)
*G06T 15/20* (2011.01)
(Continued)

(52) U.S. Cl.
CPC ............ *G06T 17/00* (2013.01); *G06T 15/205* (2013.01); *G06V 10/764* (2022.01);
(Continued)

(58) Field of Classification Search
CPC ... G06T 17/00; G06T 15/205; G06T 2200/08; G06T 2215/16; G06T 7/579;
(Continued)

(56) References Cited

U.S. PATENT DOCUMENTS

2004/0068187 A1* 4/2004 Krause ................. A61B 17/151
600/443
2019/0035149 A1 1/2019 Chen et al.
(Continued)

FOREIGN PATENT DOCUMENTS

CN 104539868 A 4/2015
CN 106504321 A 3/2017
(Continued)

OTHER PUBLICATIONS

Tao Yu et al., DoubleFusion: Real-time Capture of Human Performances with Inner Body Shapes from a Single Depth Sensor, Proceedings of the IEEE conference on computer vision and pattern recognition, 2018, 10 pages.
(Continued)

*Primary Examiner* — Xiao M Wu
*Assistant Examiner* — Latrell Anthony Creary (57) ABSTRACT

A device for reconstructing a 3D model is disclosed. The device includes: a camera; and a processor configured to: determine a class of a subject; capture one or more images of the subject by using the camera; extract semantic information from the one or more images based on the determined class; update the 3D model by using the one or more images; estimate incomplete semantic parts of the 3D model; and present semantic guidance for a user to capture the incomplete semantic parts. In this way, clearly understandable guidance is provided for reconstructing a complete 3D model.

20 Claims, 7 Drawing Sheets

(51) Int. Cl.
*G06V 10/764* (2022.01)
*H04N 1/00* (2006.01)

(52) U.S. Cl.
CPC ..... *H04N 1/00183* (2013.01); *G06T 2200/08* (2013.01); *G06T 2215/16* (2013.01)

(58) Field of Classification Search
CPC ....... G06T 2200/24; G06T 2207/10016; G06T 2207/10024; G06T 2207/10028; G06T 2207/20076; G06T 2207/30196; G06T 7/55; G06V 10/764; H04N 1/00183; H04N 1/00827; H04N 1/19594
See application file for complete search history.

(56) References Cited

U.S. PATENT DOCUMENTS

| | | |
|---|---|---|
| 2019/0196180 A1 | 6/2019 | Han et al. |
| 2019/0259221 A1 | 8/2019 | Alvarez et al. |
| 2020/0257862 A1 | 8/2020 | Kar et al. |
| 2023/0165482 A1* | 6/2023 | Mahfouz ............... A61B 5/1114 703/2 |

FOREIGN PATENT DOCUMENTS

| | | |
|---|---|---|
| CN | 109035391 A | 12/2018 |
| CN | 111179426 A | 5/2020 |
| CN | 110411415 B | 1/2022 |
| EP | 3627452 A1 | 3/2020 |
| WO | 2020118565 A1 | 6/2020 |

OTHER PUBLICATIONS

Zhi-Quan Cheng et al., Non-rigid Registration in 3D Implicit Vector Space, 2010 Shape Modeling International Conference, Jun. 21-23, 2010, 10 pages.
Shunsuke Saito et al., PIFu: Pixel-Aligned Implicit Function for High-Resolution Clothed Human Digitization, Proceedings of the IEEE International Conference on Computer Vision, 2019, 11 pages.
Michael Laielli et al., LabelAR: A Spatial Guidance Interface for Fast Computer Vision Image Collection, https://doi.org/10.1145/3332165.3347927, Oct. 20, 23, 2019, 12 pages.
Kenji Fudono et al., Interactive 3-D Modeling SystemUsing a Hand-Held Video Camera, Scandinavian Conference on Image Analysis. Springer, Berlin, Heidelberg, 2005, 11 pages.
Thiemo Alldieck et al., Detailed Human Avatars from Monocular Video, DOI 10.1109/3DV.2018.00022, 2018. 12 pages.
Huawei, Transform your toy into a 3D model, https://consumer.huawei.com/au/support/faq/transform-your-toy-into-a-3d-model, 2019, 13 pages.
Bellus3d, Bellus3D FaceApp, https://sourceforge.net/software/product/Bellus3D-FaceApp/, 2015, 5 pages.
International Search Report and Written Opinion issued in PCT/CN2020/110387, dated Jun. 1, 2021, 10 pages.
Extended European Search Report issued in EP20949871.6, dated Aug. 28, 2023, 8 pages.

* cited by examiner

SEMANTIC GUIDANCE FOR 3D RECONSTRUCTION

CROSS-REFERENCE TO RELATED APPLICATIONS

This application is a continuation of International Application No. PCT/CN2020/110387, filed on Aug. 21, 2020, the disclosure of which is hereby incorporated by reference in its entirety.

TECHNICAL FIELD

The present invention relates to a device and a method for reconstructing a 3D model.

BACKGROUND

Image-based 3D Reconstruction by scanning real objects by consumers with a hand-held camera, which could be embedded in a mobile system, is important for creating AR (Augmented Reality) content. To make an accurate and complete 3D model from images or a video, the whole surface of a target object needs to be captured. However, scanning the whole surface of the object is not easy for consumers with a hand-held camera, and some parts may not be scanned. Such incomplete scanning generates an incomplete 3D model in which some parts are missed or not scanned. In order to deal with this problem, there are four prior art categories in this field.

The first prior art category is single photo reconstruction. This prior art reconstructs a complete 3D model of a human from a single frontal image of a human based on neural networks. So, no guidance for capturing multiple images is required. However, the back of the human is not included in the input frontal image, and therefore the back of the 3D model may have artifacts with inaccurate shapes and colors by its nature. This prior art also has an extension to input multiple images including back images to decrease the artifacts but does not mention how users capture multiple images to cover whole surface of the human.

The second prior art category is "scanned or not" guidance. This prior art uses a spatial guidance for image-based 3D reconstruction. Spatially distributed arrows on a hemisphere surrounding the target object to specify preferred positions and directions for complete scanning are overlaid on a camera preview. Users are supposed to move the position and direction of a hand-held camera to complete all the arrows. Completed arrows change their colors, so that users understand which parts are taken or not taken. However, the arrows could be outside of the camera preview especially when the target object is large. In this case, the arrows are invisible from users, and users could have difficulty to understand which parts are taken or not taken. Such scanned or not guidance to show indicators such as the arrows of scanned parts and not scanned parts in close proximity of the target object has inevitable risk that the indicators could become invisible from users.

The third prior art category is movement guidance. This prior art uses a movement guidance for image-based 3D reconstruction. Arrows, which specify preferred movement of a camera for complete scanning, are overlaid on a camera preview. Users are supposed to move a hand-held camera according to the arrows. However, even if users move the hand-held camera according to the arrows, scanning could be incomplete or take much time for completion because users do not know exactly which parts are not taken and should be scanned.

The fourth prior art category is semantic reconstruction. This prior art uses image-based 3D human reconstruction from multiple images taking semantic information into account. Quality of a 3D human model is improved by semantic information of a human extracted from images. The semantic information is specifically composed of facial landmarks, body joint positions and body parts segmentations. However, the semantic information is not used for guidance for how to capture the multiple images.

SUMMARY

A device and a method for reconstructing a 3D model is provided to achieve clearly understandable guidance for reconstructing a complete 3D model.

According to a first aspect, a device for reconstructing a 3D model is provided, wherein the device includes: a camera; and a processor configured to: determine a class of a subject: capture one or more images of the subject by using the camera: extract semantic information from the images based on the determined class: update the 3D model by using the images: estimate incomplete semantic parts of the 3D model; and present semantic guidance for the user to capture the incomplete semantic parts.

In a possible implementation manner of the first aspect, estimating incomplete semantic parts of a 3D model includes: generating a semantic 3D model which is a 3D model with the semantic information; and determining incomplete semantic parts based on the semantic 3D model.

In a possible implementation manner of the first aspect, estimating incomplete semantic parts of a 3D model includes: generating a semantic 3D model which is a 3D model with the semantic information; deforming a template model to the semantic 3D model: calculating an error for each semantic part between the semantic 3D model and the deformed template model; and determining incomplete semantic parts based on the error.

In a possible implementation manner of the first aspect, the class of the subject is determined based on temporary images captured by using the camera, or a user input.

In a possible implementation manner of the first aspect, the device further comprises a speaker, and the semantic guidance is presented as sound.

In a possible implementation manner of the first aspect, the device further comprises a display, and the semantic guidance is presented as text or one or more figures.

According to a second aspect, a device for reconstructing a 3D model is provided, wherein the device includes: a camera; and a processor configured to: determine a class of a subject: capture one or more images of the subject by using the camera: update the 3D model by using the images; deform a template model to the 3D model: calculate an error for each semantic part between the 3D model and the deformed template model; determine incomplete semantic parts based on the error; and present semantic guidance for the user to capture the incomplete semantic parts.

According to a third aspect, a method for reconstructing a 3D model is provided, wherein the method includes: determining a class of a subject: capturing one or more images of the subject by using a camera: extracting semantic information from the images based on the determined class: updating the 3D model by using the images: estimating incomplete semantic parts of the 3D model; and presenting semantic guidance for the user to capture the incomplete semantic parts.

According to a fourth aspect, a storage media storing a program is provided, wherein when the program is executed by a processor, the program makes the processor to perform the method according to the second aspect.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are only some but not all of the embodiments of the present invention. All other embodiments obtained by a person of ordinary skill in the art based on the embodiments of the present invention without creative efforts shall fall within the protected scope of the present invention.

A first embodiment of the present invention is a 3D reconstruction application on a mobile system 100. In this embodiment, during scanning a subject with a camera, incomplete semantic parts (for example, left leg, head, etc. for a human) of a reconstructed 3D model are estimated, and then guidance is provided for a user to scan the estimated incomplete semantic parts. The semantic parts could have hierarchical structures. For example, legs of human body could be composed of right and left leg, and each leg could be composed of upper part, lower part and foot part.

Figure 1:
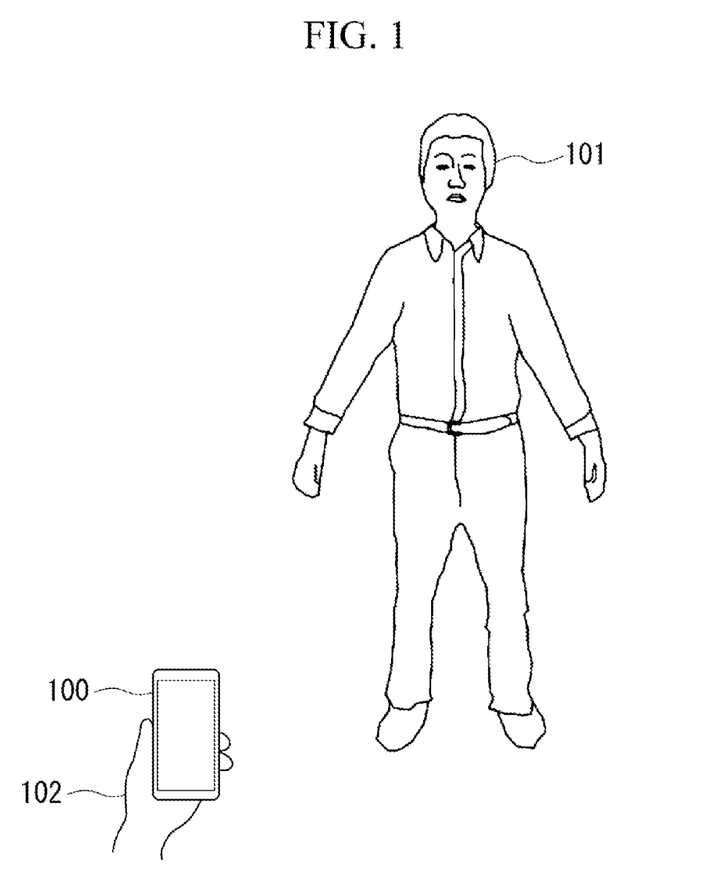
FIG. 1 illustrates an example of a usage scene of a 3D reconstruction application on a mobile system 100.

FIG. 1 illustrates an example of a usage scene of a 3D reconstruction application on a mobile system 100 according to a first embodiment of the present application. First, a user 102 captures a target subject 101 with the mobile system 100 for 3D reconstruction. In FIG. 1, the target subject 101 is a human. The mobile system 100 may be a mobile device such as a smart phone, a tablet computer, or any kind of portable devices. If the target subject 101 can move to be captured in various directions, the mobile system 100 may be a device fixed on a desk, floor, etc. In order to reconstruct a complete 3D model of the subject from the 2D images captured with a camera, it is ideal to capture enough images to cover almost all of the surfaces of the subject. However, if the captured images are not enough, the reconstructed 3D model may lack some part of the subject. Then, the mobile system 100 suggests the guidance to capture more images at areas where a 3D model is incomplete. The user 102 can move the mobile system 100 according to the guidance to make a complete 3D model.

Figure 2:
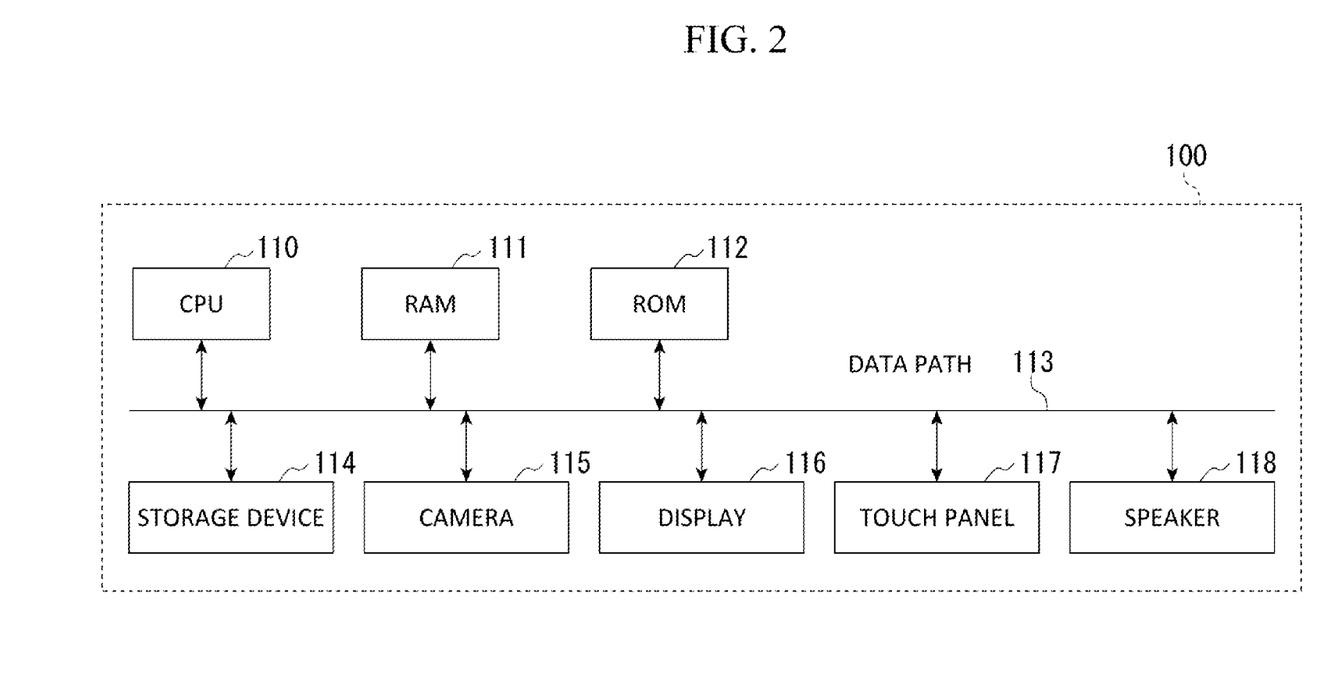
FIG. 2 illustrates a block diagram of hardware configuration of the mobile system 100.

FIG. 2 depicts a block diagram of hardware configuration of the mobile system 100 according to the first embodiment. The mobile system 100 includes a CPU (Central Processing Unit) 110, a RAM (Random Access Memory) 111, a ROM (Read Only Memory) 112, storage devices 114, a camera 115, a display 116, a touch panel 117 and speaker 118. The CPU 110 sends control signals to each element connected with a data path 113. The RAM 111 is used as a main memory of the CPU 110. The ROM 112 stores an OS (Operating System), programs, system drivers and so on. The storage devices 114 store most data of the mobile system 100 and may be an SSD (Solid-State Drive), an HDD (Hard Disk Drive) or other disk drives. The camera 115 may be CMOS (Complementary Metal Oxide Semiconductor) image sensors, depth sensors or additional sensors to capture images or videos. The kinds of depth sensors may be ToF (Time-of-Flight) sensor, structured lights and so on. The display 116 shows a GUI (Graphical User Interface) and a picture captured with the camera 115. The user can input any signals via the touch panel 117 and the signals are sent to the CPU 110. A speaker 118 provides semantic guidance in voice. The semantic guidance means guidance for semantic parts of the subject to be captured.

Figure 3:
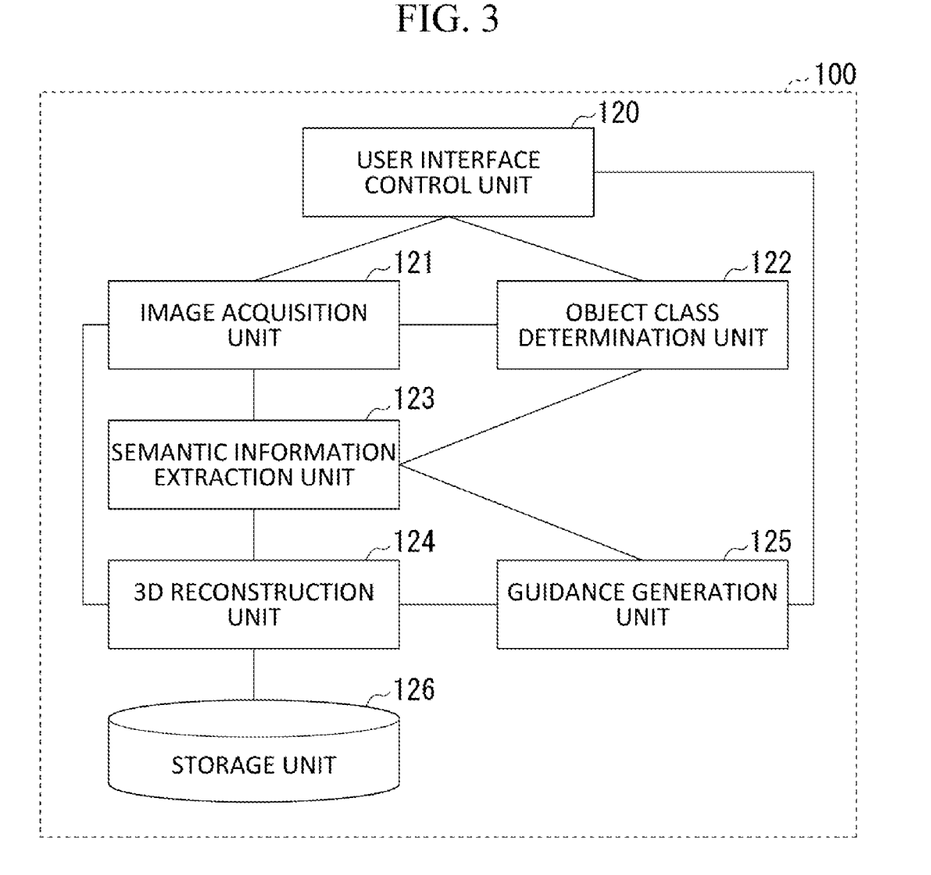
FIG. 3 illustrates a block diagram of functional configuration of the mobile system 100.

FIG. 3 shows a block diagram of functional configuration of the mobile system 100 according to the first embodiment. When a 3D reconstruction application is executed using the hardware shown in FIG. 2, this functional configuration is realized. The mobile system 100 includes a user interface control unit 120, an image acquisition unit 121, an object class determination unit 122, a semantic information extraction unit 123, a 3D reconstruction unit 124, a guidance generation unit 125 and a storage unit 126.

The user interface control unit 120 receives user inputs such as a touch, a swipe and so on through the touch panel 117. The user interface control unit 120 shows GUIs and images on the display 116.

The image acquisition unit 121 captures one or more images and stores them as temporary images. The format of the images may be color, depth or both.

The object class determination unit 122 estimates a class of a subject. The class means a rough category of the subject, such as "a human", "a cat", "a dog" and so on. The object class determination unit 122 could be implemented by using an image recognition method for the temporary images captured with the image acquisition unit 121. The output of the classification may be a probabilistic vector, whose dimension is the number of the classes, and the classes of subjects may be determined with statistical methods such as a maximum likelihood estimation. If multiple subject candidates are included in the image, the object class determination unit 122 selects a single dominant subject and output the class of the selected subject. The single dominant subject could be but not limited to the largest subject in the image. The object class determination unit 122 could be implemented in other ways. For example, the user selects and determines a class from among predefined classes on the GUI.

The semantic information extraction unit 123 extracts class specific semantic information from the images. Semantic information is positional information of parts that constitute the subject for each class. The semantic information includes but not limited to landmarks, joints and semantic masks. The landmarks are specific feature points for each class, for example, eyes, a mouse, etc. of a human. The semantic mask is a mask image of a specific region for each class. For example, a mask image is each body part such as a head, a left leg, a right arm, etc. which have distinct values or functions for a human. This process could be implemented by any methods for example, machine learning or heuristics. The semantic information extraction unit 123 also generates foreground masks to specify whole region of the subject in the input images.

The 3D reconstruction unit 124 reconstructs a 3D model from the images captured with the image acquisition unit 121 by gradually updating the 3D model by using the images captured by the image acquisition unit 121.

The guidance generation unit 125 generates semantic guidance for suggesting how to capture images which can be used to complement incomplete semantic parts of the 3D model.

The storage unit 126 stores the images captured with the image acquisition unit 121 and the 3D model reconstructed with the 3D reconstruction unit 124.

Figure 4:
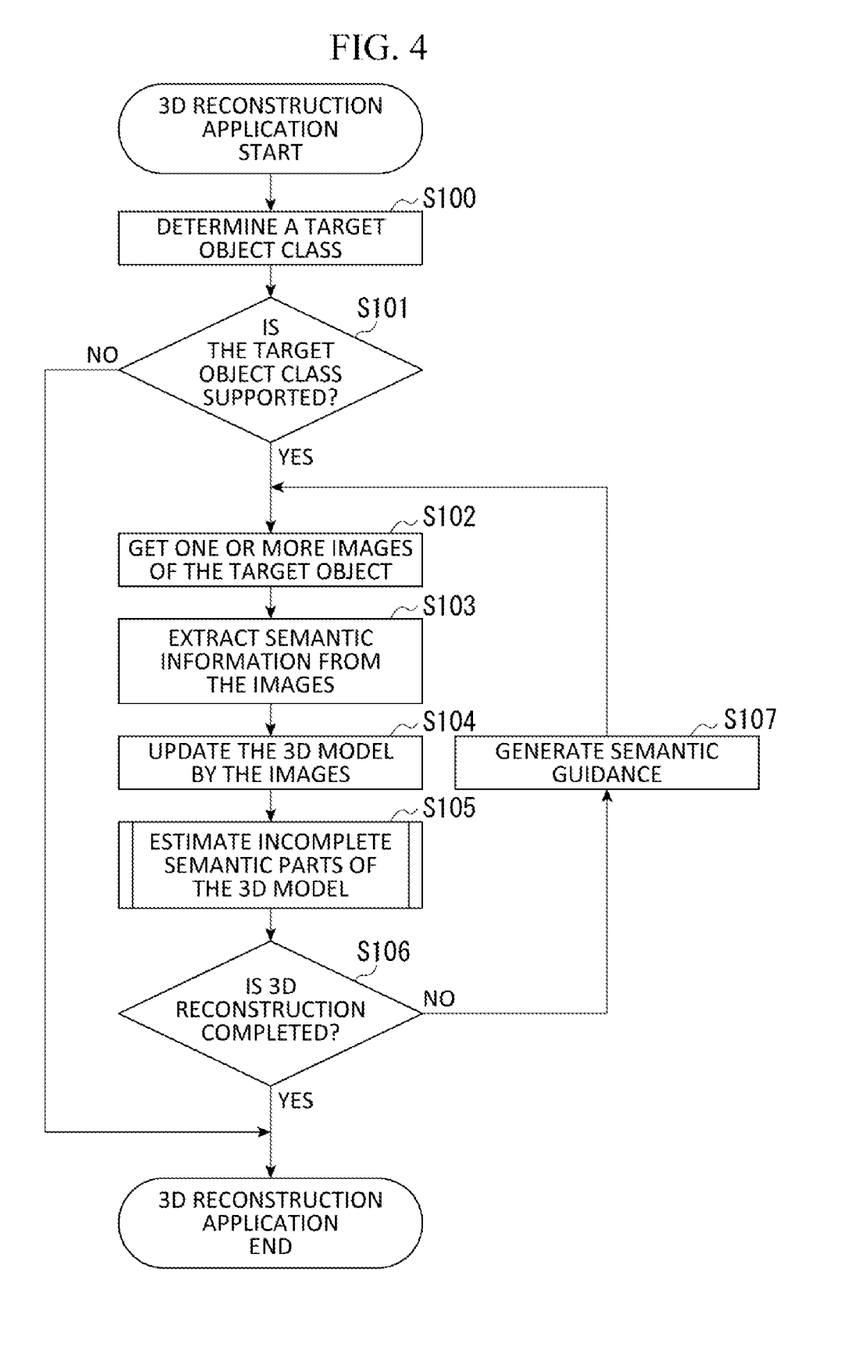
FIG. 4 illustrates an overall flowchart according to the first embodiment.

The following describes an overall flowchart according to the first embodiment by referring to FIG. 4. FIG. 4 illustrates an overall flowchart according to the first embodiment. This is a main flowchart of a 3D reconstruction application.

At step S100, the object class determination unit 122 determines the class of the target subject 101 as described above. The temporary images used by the object class determination unit 122 may be captured with the image acquisition unit 121 for determining the class of the target subject 101, or may be the images previously stored in the image acquisition unit 121 as temporary images. The class of the target subject 101 may be selected by the user from among the predefined classes.

At step S101, the object class determination unit 122 examines if the determined class is supported by the 3D reconstruction application. The supported classes are predefined in the mobile system 100. If the determined class is supported by the mobile system 100, go to step S102. Otherwise, the 3D reconstruction application finishes.

At step S102, the image acquisition unit 121 obtains one or more images of the target subject 101 from the camera 115.

At step S103, the semantic information extraction unit 123 extracts class specific semantic information and foreground masks from the images obtained at step S102 based on the determined class.

At step S104, the 3D reconstruction unit 124 updates the 3D model of the target subject 101 based on the images obtained at step S102. The semantic information and foreground masks could be further integrated to improve robustness and accuracy. The data structure of the shape of the 3D model could be point clouds, polygonal meshes or implicit functions. The 3D model could have color information additionally. SLAM (Simultaneous Localization and Mapping), SfM (Structure-from-Motion), MVS (Multi-View Stereo), SfS (Shape-from-Silhouette), or machine learning based methods could be used to update the 3D model.

At step S105, the guidance generation unit 125 estimates incomplete semantic parts of the 3D model. The details of this step will be described later.

At step S106, the 3D reconstruction unit 124 examines if the 3D reconstruction is completed. Completion criteria could include but not limited to that no incomplete semantic parts are left. If the 3D reconstruction is completed, the 3D reconstruction application finishes after the storage unit 126 saves the 3D model into the storage device 114. Otherwise, go to step S107.

At step S107, the guidance generation unit 125 generates guidance for user to capture the images of the incomplete semantic parts and the user interface control unit 120 presents the guidance by using the display 116 or the speaker 118. The details of guidance will be described later.

Figure 5:
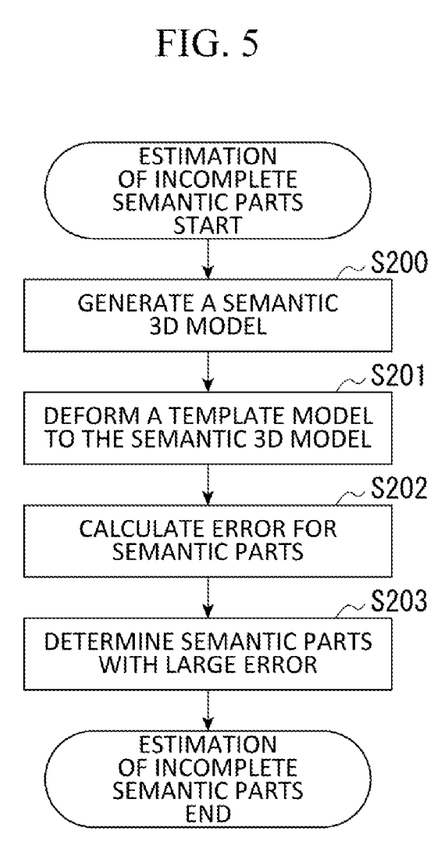
FIG. 5 illustrates a detailed flowchart of step S105.
Figure 6:
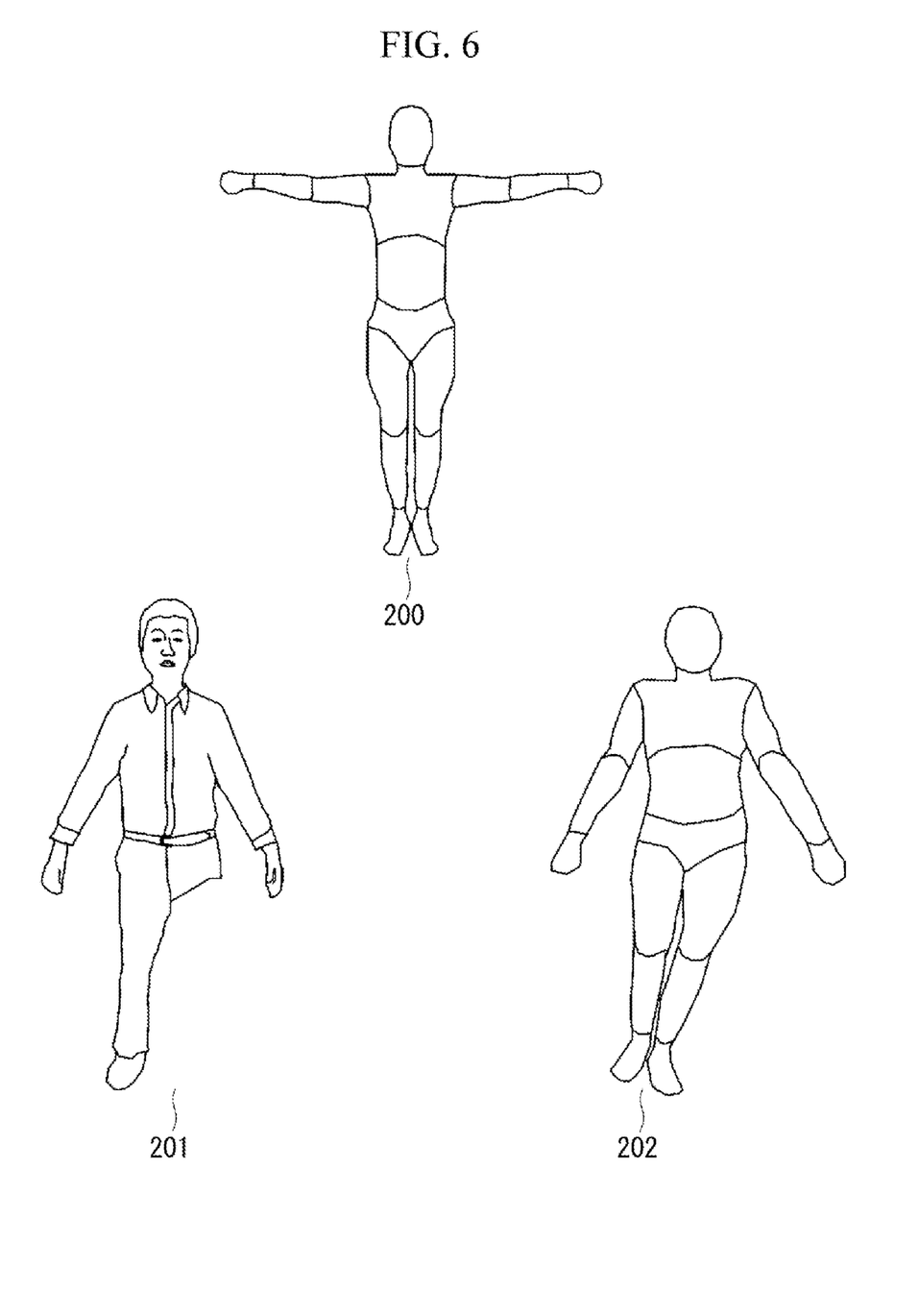
FIG. 6 illustrates an example of a template model and its deformation to a 3D model.

The following describes a detailed flowchart of step S105 for determining incomplete semantic parts of the 3D model by referring to FIG. 5 and FIG. 6. FIG. 5 illustrates the detailed flowchart of step S105. FIG. 6 illustrates an example of a template model and its deformation to a 3D model.

At step S200, the guidance generation unit 125 generates a semantic 3D model. The semantic 3D model is a 3D model with the semantic information. For example, values of the semantic masks could be assigned on the 3D model.

At step S201, the guidance generation unit 125 deforms a template model to the semantic 3D model. The template model predefined per supported class represents an average shape and a default pose of the 3D model for the corresponding class. The template model has at least the same semantic information as the semantic information that can be extracted by the semantic information extraction unit 123. The template model could be represented as a parametric model such as rigged mesh or a blend shape or a non-parametric model such as a normal mesh with a default shape and pose. In the first embodiment, a template model 200 of a human in FIG. 6 is a parametric rigged mesh with joints and bones. Pose and shape are parameterized so that the template model could be deformed to any 3D model of the same class with possible shape and pose by optimizing parameters. Body parts are explicitly segmentalized on the template model.

In FIG. 6, the template model 200 with a default shape and pose is deformed to fit its surface to a semantic 3D model 201 whose left leg is incompletely reconstructed. The deformation is implemented by parameter optimization and/or non-rigid ICP (Iterative Closest Point) of vertices. Initial values for the deformation could be roughly estimated by correspondence of semantic parts and/or geometric analysis of the shape of the semantic 3D model. Error function for the deformation could be composed of 3D Euclidian distance and/or semantic parts correspondence ratio under the nearest neighbor correspondence. After the deformation, a deformed template model 202 is generated. Pose and shape are optimized to fit the semantic 3D model 201. Note that the left leg of the deformed template model 202 wrongly fits to the closest right leg of the 3D model 201 because the left leg of the semantic 3D model 201 is missing.

At step S202, the guidance generation unit 125 calculates an error for each semantic part. For example, an error could be but not limited to average 3D Euclidian distance between the surface of the semantic 3D model 201 and that of deformed template model 202 under the nearest neighbor correspondence. In FIG. 6, errors of the left leg parts are much larger than the other parts.

At step S203, the guidance generation unit 125 determines semantic parts with a larger error than the predefined threshold as incomplete semantic parts. In FIG. 6, the left leg parts including upper part, lower part and foot are determined as incomplete semantic parts.

In this embodiment, semantic masks and a template model are jointly used to determine incomplete semantic parts to accurately estimate incomplete semantic parts.

However, only either one of the semantic masks or the template model may be used.

As an example of the semantic masks only case, incompleteness could be determined by thresholding the number of pixels of each semantic part on the semantic 3D model without using the template model. In this case, instead of the steps in FIG. 5, the following steps are performed: generating a semantic 3D model which is a 3D model with the semantic information; and determining incomplete semantic parts based on the semantic 3D model.

As an example of the template model only case, deformation between the 3D model and the template model is performed based on only geometrically computed error (e.g., 3D Euclidian distance) without semantic masks. In this case, the semantic information extraction unit 123 in FIG. 3 and step S103 in FIG. 4 can be omitted. Regarding step S105 in FIG. 4, instead of the steps in FIG. 5, the following steps are performed; deforming a template model to the 3D model: calculating an error for each semantic part between the 3D model and the deformed template model; and determining incomplete semantic parts based on the error.

Figure 7:
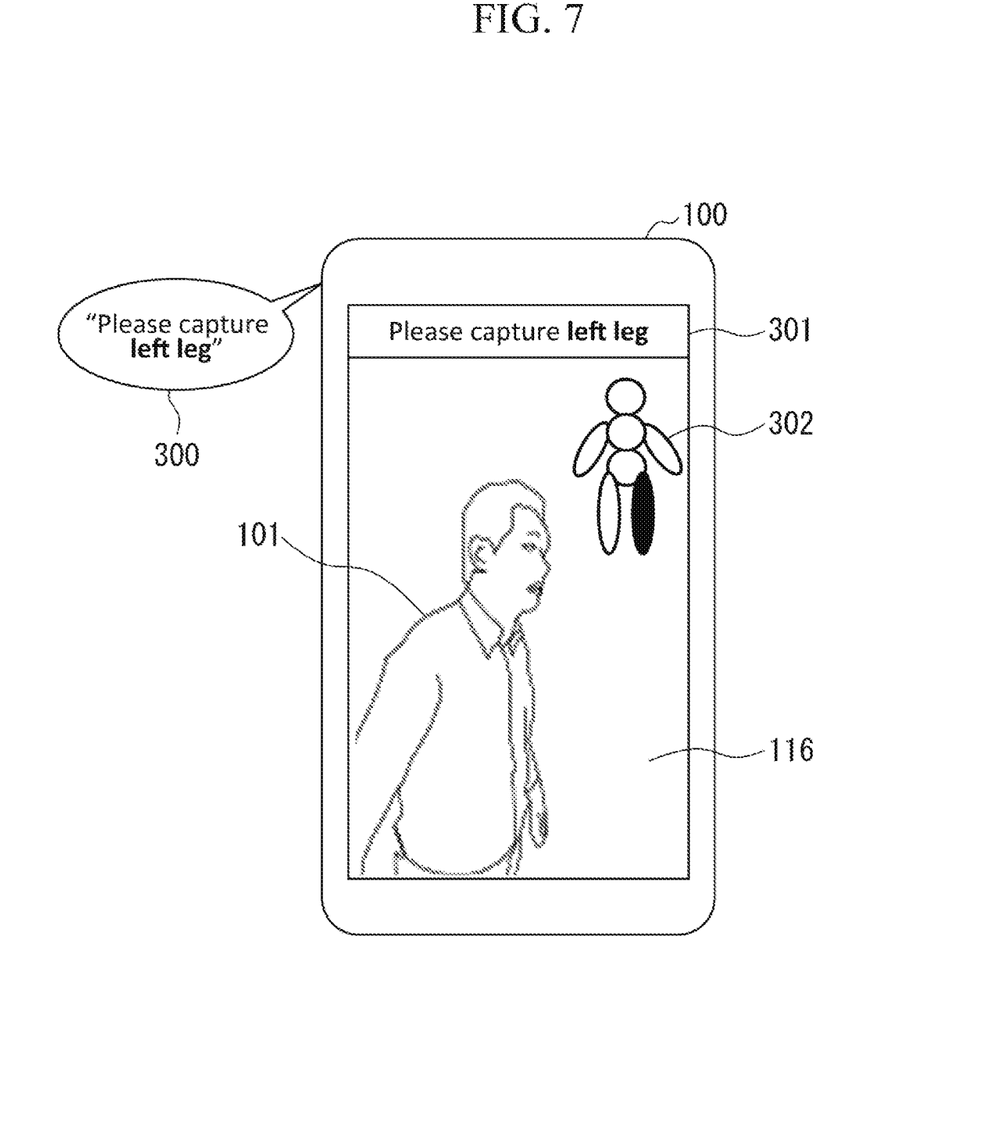
FIG. 7 illustrates examples of guidance on the mobile system 100.

The following describes the details of step S107 for generating semantic guidance by referring to FIG. 7. FIG. 7 illustrates examples of guidance on the mobile system 100 capturing the target subject 101 from the upper right direction, thereby the left leg of the reconstructed 3D model is incomplete. Based on the estimated incomplete semantic parts, guidance to scan these parts are presented to the user 102. There could be three types of guidance: sound guidance 300, text guidance 301 and figure guidance 302.

The sound guidance 300 is the guidance in sound or voice to be played by the speaker 118. For example, synthesized or recorded voice that "Please capture left leg" is played if the left leg of the reconstructed 3D model is incomplete. As another example, special sounds corresponding to semantic parts could be played.

The text guidance 301 is the guidance in text on the display 116. For example, "Please capture left leg" is displayed if the left leg of the reconstructed 3D model is incomplete.

The figure guidance 302 is the guidance by drawings on the display 116. For example, a simplified human drawing with the left leg in a different color is displayed if the left leg of the reconstructed 3D model is incomplete.

The embodiment of the present invention uses semantic information for incomplete parts estimation and user guidance for image-based 3D reconstruction. If the mobile system 100 lacks this kind of guidance, consumers (non-professionals for 3D reconstruction) fail to scan whole surface of the target subject, some parts are not scanned, and as a result, some parts of the generated 3D model are missed, namely, the reconstructed 3D model is incomplete. By virtue of the semantic guidance, the user can scan whole surface of the target subject and generate a complete 3D model. According to the embodiment of the present invention, clearly understandable guidance for image-based 3D reconstruction is provided when consumers scan real objects by a hand-held camera embedded in the mobile system.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A device for reconstructing a 3D model, comprising:
a camera; and
at least one processor configured to:
determine a class of a subject;
capture one or more images of the subject by using the camera;
extract semantic information from the one or more images based on the determined class of the subject;
update the 3D model by using the one or more images;
generate a semantic 3D model, the semantic 3D model being a 3D model with the semantic information;
deform a template model to the semantic 3D model with the semantic information to generate a deformed template model;
estimate one or more incomplete semantic parts of the 3D model based on the semantic 3D model and the deformed template model; and
present semantic guidance for a user to capture the one or more incomplete semantic parts.

2. The device according to claim 1, wherein the estimating of the one or more incomplete semantic parts of a 3D model comprises:
calculating an error for each semantic part between the semantic 3D model and the deformed template model; and
determining the one or more incomplete semantic parts based on the error.

3. The device according to claim 2, wherein the error is an average 3D Euclidian distance between a surface of the semantic 3D model and that of the deformed template model.

4. The device according to claim 1, wherein the class of the subject is determined based on temporary images captured by using the camera, or a user input.

5. The device according to claim 1, wherein the device further comprises a speaker, and the semantic guidance is presented as sound.

6. The device according to claim 1, wherein the device further comprises a display, and the semantic guidance is presented as text or one or more figures.

7. The device according to claim 1, wherein the semantic information comprises positional information of parts that constitute the subject for the class.

8. The device according to claim 1, wherein the semantic information comprises landmarks, joints and semantic masks, wherein the landmarks comprise feature points for each class, the semantic masks comprise a mask image of a region for each class.

9. The device according to claim 1, wherein the deforming of the template model to the semantic 3D model is implemented by parameter optimization and/or non-rigid Iterative Closest Point (ICP) of vertices.

10. A device for reconstructing a 3D model, comprising:
a camera; and
at least one processor configured to:
determine a class of a subject;
capture one or more images of the subject by using the camera;
update the 3D model by using the one or more images;
deform a template model to a semantic 3D model with semantic information to generate a deformed template model;
calculate an error for each semantic part between the semantic 3D model and the deformed template model;
determine one or more incomplete semantic parts based on the error; and present semantic guidance for a user to capture the one or more incomplete semantic parts.

11. The device according to claim 10, wherein the deformation of the template model is implemented by parameter optimization and/or non-rigid Iterative Closest Point (ICP) of vertices.

12. A method for reconstructing a 3D model, comprising:
determining a class of a subject;
capturing one or more images of the subject by using a camera;
extracting semantic information from the one or more images based on the determined class of the subject;
updating the 3D model by using the one or more images;
generating a semantic 3D model, the semantic 3D model being a 3D model with the semantic information;
deforming a template model to the semantic 3D model with the semantic information to generate a deformed template model;
estimating one or more incomplete semantic parts of the 3D model based on the semantic 3D model and the deformed template model; and
presenting semantic guidance for a user to capture the one or more incomplete semantic parts.

13. The method according to claim 12, wherein the estimating of the one or more incomplete semantic parts of the 3D model comprises:
generating a semantic 3D model which is a 3D model with the semantic information; and
determining the one or more incomplete semantic parts based on the semantic 3D model.

14. The method according to claim 12, wherein the estimating of the one or more incomplete semantic parts of a 3D model comprises:
calculating an error for each semantic part between the semantic 3D model and the deformed template model; and
determining the one or more incomplete semantic parts based on the error.

15. The method according to claim 12, wherein the class of the subject is determined based on temporary images captured by using the camera, or a user input.

16. The method according to claim 12, wherein the semantic guidance is presented as sound, text or one or more figures.

17. A non-transitory storage media storing a program thereon, when the program is executed by at least one processor, the program makes at least one processor to perform operations comprising:
determining a class of a subject;
capturing one or more images of the subject by using a camera;
extracting semantic information from the one or more images based on the determined class;
updating a 3D model by using the one or more images;
generating a semantic 3D model, the semantic 3D model being a 3D model with the semantic information;
deforming a template model to the semantic 3D model with the semantic information to generate a deformed template model;
estimating one or more incomplete semantic parts of the 3D model based on the semantic 3D model and the deformed template model; and
presenting semantic guidance for a user to capture the one or more incomplete semantic parts.

18. The non-transitory storage media according to claim 17, wherein the estimating of the one or more incomplete semantic parts of a 3D model comprises:
calculating an error for each semantic part between the semantic 3D model and the deformed template model; and
determining the one or more incomplete semantic parts based on the error.

19. The non-transitory storage media according to claim 17, wherein the class of the subject is determined based on temporary images captured by using the camera, or a user input.

20. The non-transitory storage media according to claim 17, wherein the semantic guidance is presented as sound, text or one or more figures.

* * * * *